US009646126B1

United States Patent
Lu et al.

(10) Patent No.: US 9,646,126 B1
(45) Date of Patent: May 9, 2017

(54) POST-ROUTING STRUCTURAL NETLIST OPTIMIZATION FOR CIRCUIT DESIGNS

(71) Applicant: Xilinx, Inc., San Jose, CA (US)

(72) Inventors: Ruibing Lu, Santa Clara, CA (US); Zhiyong Wang, Cupertino, CA (US); Aaron Ng, Santa Clara, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/671,920

(22) Filed: Mar. 27, 2015

(51) Int. Cl.
G06F 9/455 (2006.01)
G06F 17/50 (2006.01)

(52) U.S. Cl.
CPC ...... *G06F 17/5068* (2013.01); *G06F 17/5077* (2013.01); *G06F 2217/84* (2013.01)

(58) Field of Classification Search
USPC ........................................................ 716/134
See application file for complete search history.

(56) References Cited

U.S. PATENT DOCUMENTS

| 7,996,797 B1* | 8/2011 | Singh .................... G06F 17/505 716/103 |
| 8,984,462 B1 | 3/2015 | Das et al. |
| 2005/0132316 A1* | 6/2005 | Suaris ................. G06F 17/5031 716/108 |

OTHER PUBLICATIONS

Ashenhurst, Robert L., "The Decomposition of Switching Functions," Proc. of the International Symposium on the Theory of Switching, Jan. 1, 1957, Part I, vol. XXIX, pp. 74-16, Harvard University Press, Cambridge, Massachusetts, USA.
Mischenko, Alan et al., "Boolean Factoring and Decomposition of Logic Networks," Proc. of the 2008 International Conference on Computer-Aided Design, Nov. 10, 2008, pp. 38-44, IEEE Computer Society, Washington DC, USA.
Naseer, A. R. et al., "Direct Mapping of RTL Structures onto LUT-Based FPGA's," IEEE Transactions on Computer-Aided Design of Integrated Circuits and Systems, Jul. 1998, vol. 17, No. 7, pp. 624-631, IEEE, Piscataway, New Jersey, USA.
Roth, J. Paul et al.,"Minimization Over Boolean Graphs," IBM Journal of Research and Development, Apr. 1962, vol. 6, Issue 2, pp. 227-238, IBM Corporation, Riverton, New Jersey, USA.
U.S. Appl. No. 14/798,269, filed Jul. 13, 2015, Lu et al., San Jose, CA USA.
Altera Corporation, Netlist Optimization and Physical Synthesis, Quartus II Handbook, Chapter 16, version 13.1, vol. 2, Design Implementation and Optimization, pp. 16-1-16-16, Nov. 2013, San Jose, CA USA.
Altera Corporation, Timing Closure and Optimization, Quartus II Handbook, Chapter 12, version 13.1, vol. 2, Design Implementation and Optimization, pp. 12-1-12-46, Nov. 2013, San Jose, CA USA.
Singh, D.P., et al., "Two-Stage Physical Synthesis for FPGAs," Proceedings of IEEE 2005 Custom Integrated Circuits Conference, 2005, pp. 171-178, Sep. 18-21, 2005, IEEE.

(Continued)

*Primary Examiner* — Eric Lee
(74) *Attorney, Agent, or Firm* — Kevin T. Cuenot

(57) ABSTRACT

Post-routing processing of a circuit design may include determining, using a processor, a baseline delay for a path of a routed circuit design, comparing, using the processor, the baseline delay of the path with a timing constraint of the path, and selectively applying, according to the comparing, a structural netlist optimization to the path resulting in an optimized path using a processor.

20 Claims, 7 Drawing Sheets

(56) References Cited

OTHER PUBLICATIONS

Synopsys Synplify Premier Brochure, The Ultimate FPGA Implementation Platform, The Best of Both Worlds: Productivity & Performance, 2011, pp. 1-4, Mountain View, CA USA.

Ye, et al., "Physical Synthesis for ASIC Datapath Circuits," May 26-29, 2002, Circuits and Systems, 2002 ISCAS 2002 IEEE International Symposium on, pp. III-365-III-368, vol. 3, IEEE.

* cited by examiner

POST-ROUTING STRUCTURAL NETLIST OPTIMIZATION FOR CIRCUIT DESIGNS

FIELD OF THE INVENTION

This disclosure relates to integrated circuits (ICs) and, more particularly, to performing structural netlist optimization(s) for a circuit design post-routing.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected or coupled by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data may be read from memory (e.g., from an external programmable read-only memory or PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to these devices and further may encompass devices that are only partially programmable. For example, one type of programmable IC includes a combination of hard-coded transistor logic and a programmable switch fabric that programmably interconnects the hard-coded transistor logic.

In order to implement a circuit design within an IC such as a programmable IC, the circuit design undergoes a process referred to as a design flow. The design flow generally includes synthesis, placement, and routing. Synthesis includes the conversion of an abstract, programmatic description of a circuit into a low-level design implementation. Synthesis also includes mapping the low-level circuit implementation to circuit elements available on the IC in which the circuit design will be implemented referred to as the "target IC."

The abstract, programmatic description of the circuit design may be specified in a hardware description language (HDL). The abstract, programmatic description of the circuit describes behavior of the circuit and is also referred to as a "behavioral description" or a "register transfer level (RTL) description" of the circuit. The low level design implementation generated through synthesis typically is specified as inter-connected logic gates.

As part of synthesis, mapping correlates, or matches, the logic gates of the low-level circuit design to the various types of circuit blocks or resources that are actually available in the target IC. For example, since a lookup table (LUT) may implement a complex function, one or more logic gates of the low level design implementation may be mapped to a single LUT, or other programmable tile of the target IC. The mapped circuit design specifies the same functionality as the low level design implementation, albeit in terms of the particular circuit blocks available on the target IC as opposed to low-level logic gates.

Placement is the process of assigning elements of the mapped circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of the instance of the circuit block and/or resource on the target IC assigned to a circuit element of the circuit design is the location of that circuit element when placed. Routing is the process of selecting particular routing resources such as wires, PIPs, PIP settings, and/or other interconnect circuitry to electrically couple the various circuit blocks of the target IC.

Circuit designs may be evaluated against requirements set forth in a design specification after various stages of the design flow described above. Estimates of circuit design performance relating to timing, power consumption, or the like, may be compared with the requirements of the design specification to determine whether the requirements are met.

SUMMARY

A method includes determining, using a processor, a baseline delay for a path of a routed circuit design, comparing, using the processor, the baseline delay of the path with a timing constraint of the path, and selectively applying, according to the comparing, a structural netlist optimization to the path resulting in an optimized path using the processor.

A system includes a processor programmed to initiate executable operations. The executable operations include determining a baseline delay for a path of a routed circuit design, comparing the baseline delay of the path with a timing constraint of the path, and selectively applying, according to the comparing, a structural netlist optimization to the path resulting in an optimized path.

A non-transitory computer-readable medium has instructions stored thereon which, when executed by a processor, perform a method. The method includes determining a baseline delay for a path of a routed circuit design, comparing the baseline delay of the path with a timing constraint of the path, and selectively applying, according to the comparing, a structural netlist optimization to the path resulting in an optimized path.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular examples shown. Various aspects and advantages will become apparent upon review of the following detailed description with reference to the drawings.

DETAILED DESCRIPTION OF THE DRAWINGS

Figure 1:
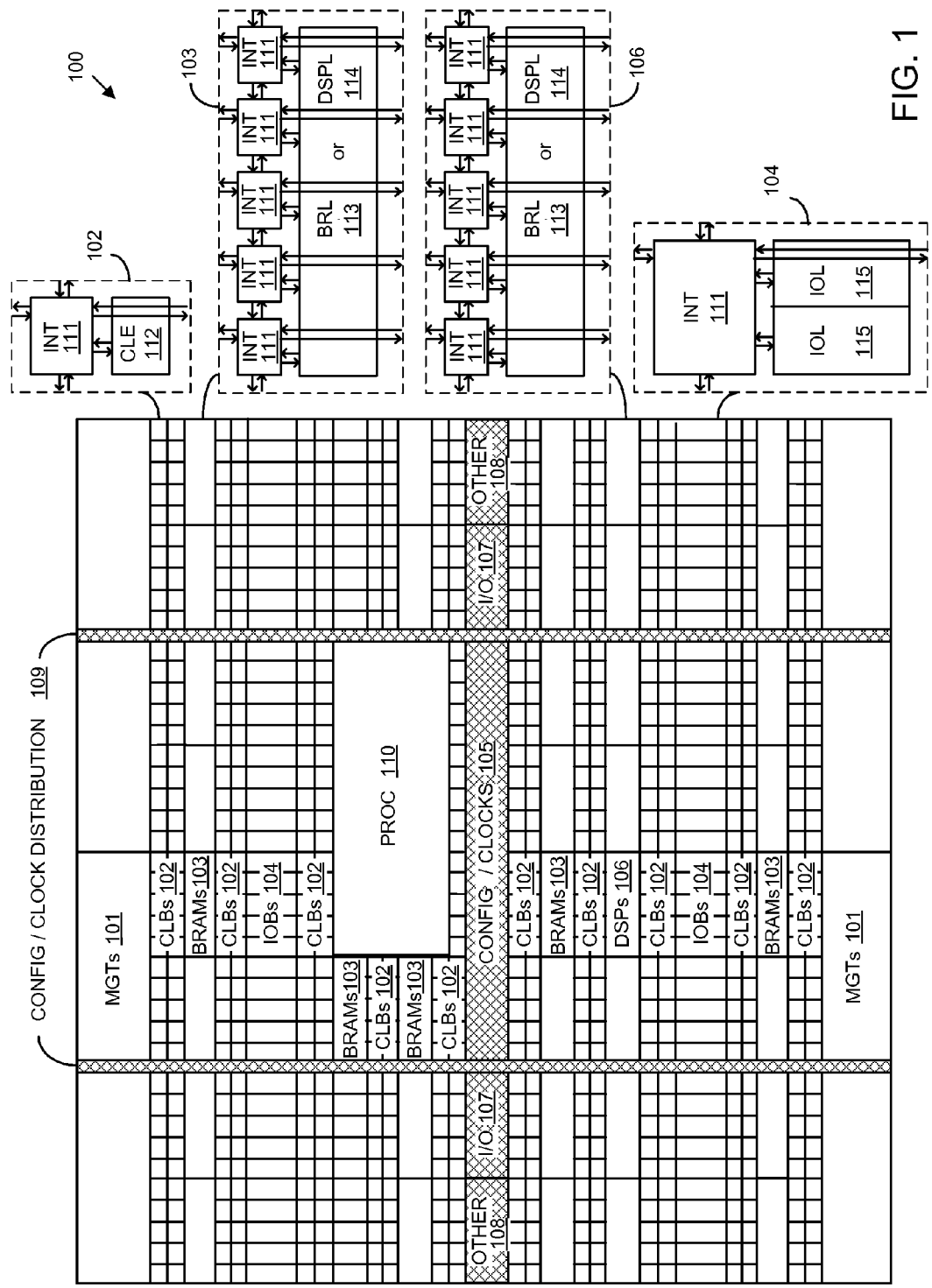
FIG. 1 is a block diagram illustrating an exemplary architecture for an integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to performing structural netlist optimization(s) for a circuit design post-routing. In accordance with the inventive arrangements described herein, a circuit design undergoes a design flow. As used within this disclosure, the term "design flow" means performing synthesis, placement, and routing on a circuit design. At a post-routing stage of the design flow, one or more structural netlist optimizations may be applied to the circuit design in order to improve timing and/or close timing.

In one aspect, one or more paths may be selected and subjected to one or more structural netlist optimizations. A selected path may be any path that meets one or more selection criteria related to timing. In one example, a path that does not meet a timing constraint may be selected for structural netlist optimization. In another example, a path may be selected to improve timing, e.g., by reducing the delay of the path even in cases where the path does meet a timing constraint.

As the design flow progresses, increasingly detailed information about the implementation of the circuit design within a target IC is available. The detailed implementation information may be determined, at least in part, since the architecture of the target IC is known. The availability of detailed implementation information allows highly accurate estimates of circuit performance, as implemented within a particular target IC, to be determined. These estimates may be compared with the established requirements for the circuit design to determine whether the requirements are met.

By performing the structural netlist optimization(s) after routing using the detailed implementation information that is available, any estimates of timing improvement achieved by the structural netlist optimization(s) are highly accurate. In one aspect, only those structural netlist optimizations that result in an improvement in the timing of the circuit design may be accepted. Structural netlist optimizations that do not result in an improvement in the timing of the circuit design may be rejected. Using this timing comparison, the structural netlist optimization(s) may be virtually guaranteed not to degrade performance of the circuit design.

The inventive arrangements described herein may be implemented as a method or process performed by a data processing system. In another aspect, the inventive arrangements may be implemented as a data processing system having a processor. The processor, upon executing program code, initiates and/or performs operations as described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary architecture 100 for an IC. In one aspect, architecture 100 is implemented within a programmable IC. For example, architecture 100 may be used to implement a field programmable gate array (FPGA). Architecture 100 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An IOB 104 may include, for example, two instances of an I/O logic element (IOL) 115 in addition to one instance of an INT 111. As will be clear to those of skill in the art, the actual I/O pads connected to IOL 115 typically are not confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks may be programmable blocks and/or dedicated circuitry. For example, a processor block depicted as PROC 110 may be included that spans several columns of CLBs and BRAMs.

In one aspect, PROC 110 is implemented as a dedicated circuitry, e.g., as a hardwired processor, that is fabricated as part of the die that implements the programmable circuitry of the IC. PROC 110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100 and replaced with one or more of the other varieties of the programmable blocks described. Further, such blocks may be utilized to form a "soft processor" in that the various blocks of programmable circuitry may be used to form a processor that may execute program code as is the case with PROC 110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 1 that are external to PROC 110 such as CLBs 102 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The configuration bitstream specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 110 or a soft processor. In some cases, architecture 100 includes a dedicated configuration processor that loads the configuration bitstream to the appropriate configuration memory and/or processor memory. The dedicated configuration processor does not execute user-specified program code. In other cases, architecture 100 may utilize PROC 110 to receive the configuration bitstream, load the configuration bitstream into appropriate configuration memory, and/or extract program code for execution.

FIG. 1 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as limitations.

Figure 2:
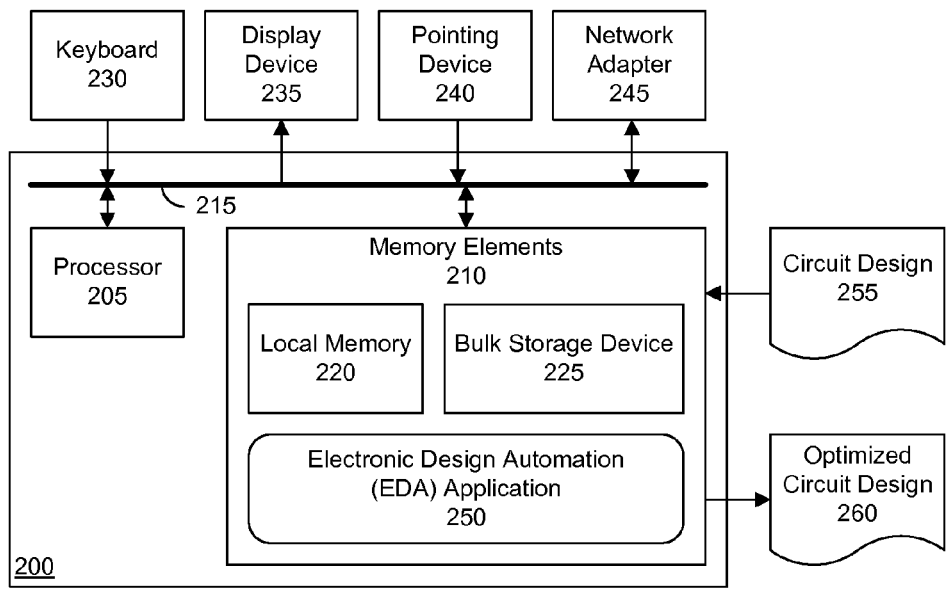
FIG. 2 is a block diagram illustrating an exemplary system.

FIG. 2 is a block diagram illustrating an exemplary system 200. System 200 includes at least one processor 205, coupled to memory elements 210 through a system bus 215 or other suitable circuitry. System 200 stores program code such as an electronic design automation (EDA) application 250, within memory elements 210. Processor 205 executes the program code accessed from memory elements 210 via system bus 215.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), a solid state drive (SSD), or another persistent data storage device. System 200 also may include one or more cache memories (not shown) that provide temporary storage of at least some program code in order to reduce the number of times program code must be retrieved from bulk storage device 225 during execution.

Input/output (I/O) devices such as a keyboard 230, a display device 235, a pointing device 240, and a network adapter 245 optionally may be coupled to system 200. The I/O devices may be coupled to system 200 either directly or through intervening I/O controllers. In some cases, one or more of the I/O devices may be combined as in the case where a touchscreen is used as display device 235. In that case, display device 235 may also implement keyboard 230 and pointing device 240. Network adapter 245 enables system 200 to become coupled to other systems, computer systems, remote printers, and/or remote storage devices through intervening private or public networks. Modems, cable modems, Ethernet cards, wireless transceivers, and/or wireless radios are examples of different types of network adapter 245 that may be used with system 200.

Memory elements 210 store EDA application 250. Memory elements 210 further may store an operating system (not shown) that may execute in cooperation with EDA application 250. In one aspect, EDA application 250 may include one or more different components or modules. EDA application 250, being implemented in the form of executable program code, is executed by system 200. As such, EDA application 250 is considered a part of system 200.

In one aspect, system 200 may be a computer or other data processing system that is suitable for storing and/or executing program code. It should be appreciated, however, that system 200 may be any system including a processor and memory that is capable of performing the functions described within this disclosure. System 200 may be implemented as a single system as shown or as a plurality of networked or interconnected systems each having an architecture the same as, or similar to, that of system 200.

System 200, while executing EDA application 250, receives and operates upon a circuit design 255. Circuit design 255 is a programmatic description of circuitry to be implemented within an IC. In one aspect, system 200 performs a design flow upon circuit design 255 that may include synthesis, placement, routing, and the application of one or more structural netlist optimizations to be described within this disclosure in greater detail.

In another aspect, circuit design 255 has been processed through a design flow that includes synthesis, placement, and routing. For example, synthesis, placement, and routing may be complete for circuit design 255. In that case, system 200 may apply one or more structural netlist optimizations as described within this disclosure to circuit design 255. In either case, system 200 generates an optimized, or modified, version of circuit design 255 that is pictured in FIG. 2 as optimized circuit design 260.

EDA application 250, circuit design 255, optimized circuit design 260, and any data items used, generated, and/or operated upon by EDA application 250 are functional data structures that impart functionality when employed as part of system 200. Further, circuit design 255 and/or optimized circuit design 260, including derivations and/or modifications thereof such as configuration bitstreams, when loaded into a target IC may be functional data structures that cause the implementation of a circuit design within the target IC. Optimized circuit design 260, for example, may be loaded into a target IC having an architecture as describe with reference to FIG. 1 or another programmable IC architecture.

Figure 3:
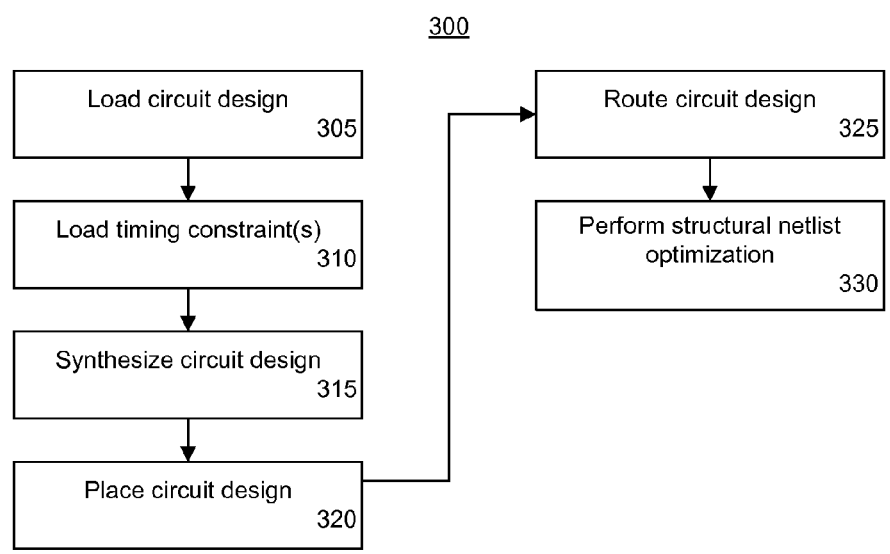
FIG. 3 is a flow chart illustrating an exemplary method of implementing a circuit design within an IC.

FIG. 3 is a flow chart illustrating an exemplary method 300 of implementing a circuit design within an IC. Method 300 is an example of a design flow used to process a circuit design. In one aspect, method 300 may be used to implement a circuit design within a programmable IC such as an FPGA and/or an IC having an architecture as described with reference to FIG. 1. Method 300 may be performed by a system as described with reference to FIG. 2.

In block 305, the system loads the circuit design. The circuit design, at least initially, may be a "behavioral description" of the circuit also referred to as a register transfer level (RTL) description. As such, the circuit design may be specified using a hardware description language (HDL).

In block 310, the system loads one or more timing constraints for the circuit design. A timing constraint may specify a timing constraint for a signal of the circuit design. For example, a timing constraint may be specified as part of a design specification for the circuit design and indicate an amount of time that a signal has to propagate from a start point to an end point, e.g., from a source to a load. It should be appreciated that while blocks 305 and 310 are shown sequentially, the system may perform blocks 305 and 310 concurrently.

In block 315, the system synthesizes the circuit design. The system processes the circuit design to generate a functionally equivalent, low level version of the circuit design specified as a plurality of inter-connected logic gates. The system further maps the circuit design by correlating, or matching, the logic gates of the low level version of the circuit design with various types of circuit blocks or resources available in the target IC.

In block 320, the system places the circuit design. For example, the circuit elements that are mapped to a type of circuit block are assigned to a particular instance of that type of circuit block. The particular instance of that circuit block has a location on the target IC. Post placement, the location of the instance of the circuit block is the location of the circuit elements placed to the instance.

In block 325, the system routes the circuit design. The system selects particular routing resources such as wires, PIPs, and/or other interconnect circuitry to electrically couple the various circuit blocks of the target IC allowing signals to be exchanged among the circuit blocks.

In block 330, the system performs one or more structural netlist optimizations on the circuit design. A structural netlist optimization is an operation that changes the netlist as it exists during the synthesis stage of a design flow. General examples of structural netlist optimizations include either one or both of the following operations performed after routing: a change to the low-level circuit design (e.g., that is generated from the abstract, programmatic description of the circuit design) or a change to the mapping of the low-level circuit design (e.g., to circuit blocks and/or resources available in the target IC).

More specific examples of structural netlist optimizations may include, but are not limited to, a remap operation, a rewire operation, a push-pull operation, a replication operation, a signal reorder operation, a retime operation, and/or a LUT insertion operation as performed on the low-level circuit design and/or the mapped circuit design. It should be appreciated that application of a structural netlist operation results in functionally equivalent circuitry. The changed and functionally equivalent circuitry then undergoes placement and routing.

In one aspect, a structural netlist operation may be performed on a path of the circuit design. As defined herein, a "path" of a circuit design is a signal that couples a start point and an end point as implemented and/or specifies using wires and/or wiring resources of a target IC. Each of the start point and the end point of a path is a synchronous, or clocked, circuit element. One or more combinatorial, or un-clocked, circuit elements may be in the path between the start point and the end point of the path.

The system may perform the structural netlist optimization(s) to improve timing. For example, the system may select one or more paths that meet a timing constraint, but by less than a predetermined amount or percentage. The system may apply one or more structural netlist optimizations to the selected paths.

In another aspect, the system may perform structural netlist optimization(s) to close timing. Closing timing generally refers to modifying the circuit design so that a path that does not meet a timing constraint does meet the timing constraint. For example, the system may determine whether any of the paths of the circuit design are critical and apply structural netlist operations to the critical path or paths.

A critical path is a path that does not meet a timing constraint. A signal may be required to traverse a path of the circuit design within a defined amount of time specified within a design specification for the circuit design and referred to as a timing constraint. Once a circuit design is routed, a highly accurate estimate of the time required for a signal to propagate the paths of the circuit design may be calculated. The system may calculate highly accurate estimates of delay because the architecture of the target IC is known and well defined. Further, the location of circuit components and the interconnections between the circuit components have been determined. The estimated time may be referred to as the delay of the path. The delay may be compared with the timing constraint for that path as specified within the design specification.

Paths having a delay that exceeds the applicable timing constraint are said, or classified, as critical paths. The term "slack" is used as a measure of criticality of a path. The "slack" of a path may be determined as the timing constraint of the path minus the delay of the path. A negative slack value means that the delay of the path is larger, or worse, than the timing constraint. A path may be considered critical in terms of timing when the slack of the path is negative. The larger the absolute value of the negative slack, e.g., the more negative the slack, the more critical the timing of the path. A positive slack value means that the path has a delay that is less than, or better, than the timing constraint.

Figure 4:
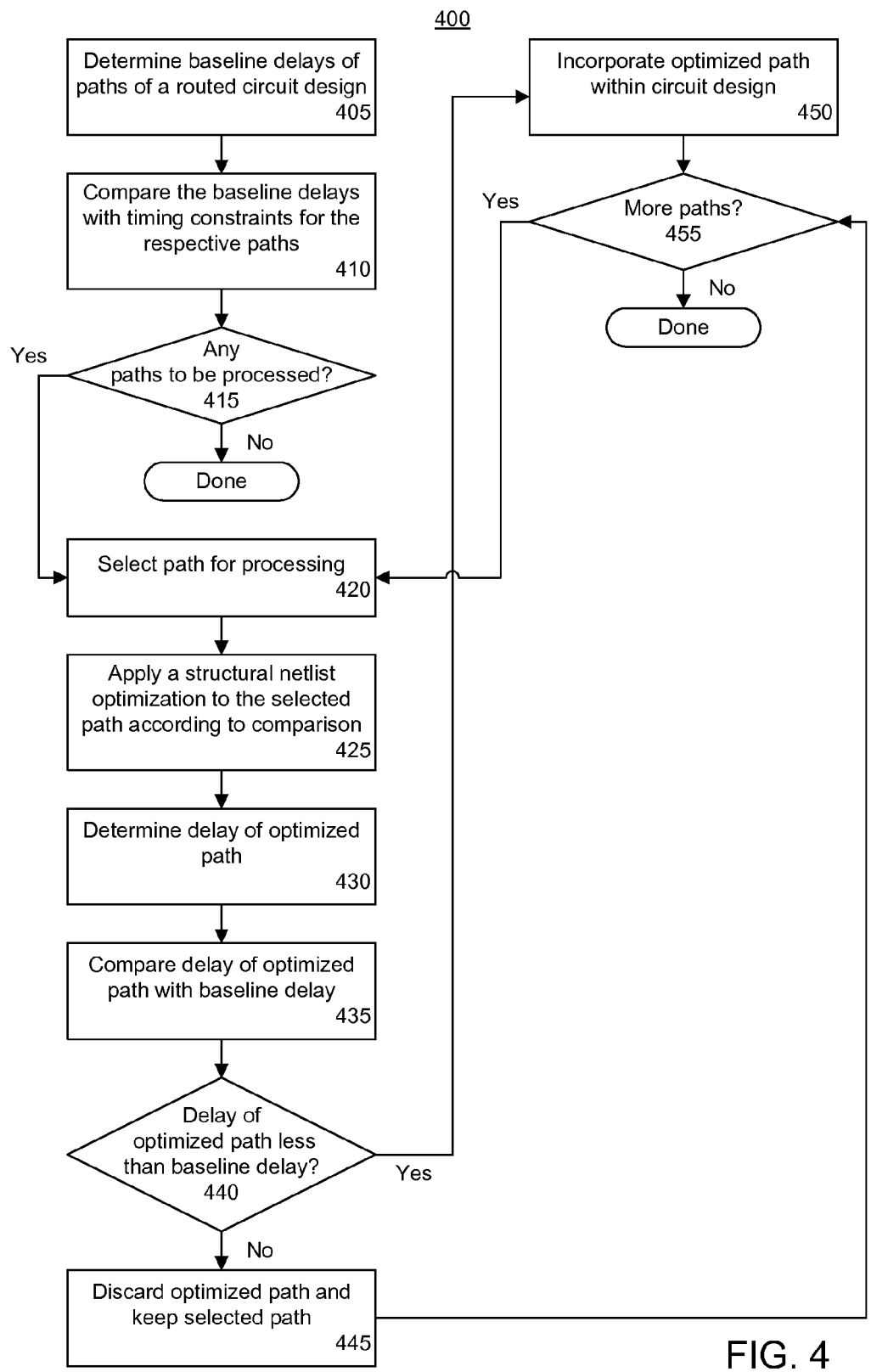
FIG. 4 is a flow chart illustrating an exemplary method of optimizing a circuit design.

FIG. 4 is a flow chart illustrating an exemplary method 400 of optimizing a circuit design. Method 400 may be performed by a system as described with reference to FIG. 2. Method 400 may begin in a state where the circuit design has been routed. For example, method 400 may be an exemplary implementation of block 330 of FIG. 3. Method 400 may be used to process one or more paths of the routed circuit design.

In block 405, the system determines baseline delays for paths of the routed circuit design. The baseline delay of a path is the estimated delay of the path after routing and prior to application of any structural netlist optimizations. In block 410 the system compares the baseline delays of the paths with the timing constraints for the respective paths.

In block 415, the system determines whether any paths are to be processed. If the system identifies paths to be processed, method 400 continues to block 420. If not, method 400 may end. For example, the system may compare the baseline delay of a path with a timing constraint of the path. The system may identify paths with negative slack and/or non-critical paths where the difference between the timing constraint of the path and the delay is less than a predetermined amount.

In block 420, the system selects a path for processing. For example, paths may be sorted according to criticality with the most critical path being selected for processing first, followed by the second most critical path, etc., with the least critical path being processed last. In another example, non-critical paths may be sorted according to the difference between the timing constraint and the baseline delay with the path having the largest difference being processed first, followed by the path with the second largest difference, etc., with the path with the smallest difference.

In block 425, the system applies one or more structural netlist optimizations to the selected path according to the comparison performed in block 410. In this regard, the one or more structural netlist optimizations may be selectively applied according to the comparison. For example, the system may apply structural netlist optimization(s) to those paths determined to qualify for processing in block 415. Accordingly, in one aspect, one or more structural netlist optimizations may be applied to the selected path responsive to determining that the baseline delay of the path exceeds the timing constraint of the path. In another aspect, one or more structural netlist optimizations may be applied to the path responsive to determining that the baseline delay of the path, while not exceeding the timing constraint of the path, is within a predetermined amount or percentage of the timing constraint of the path.

It should be appreciated that as part of applying a structural netlist optimization to a path, the system continues operating on the path through the remaining stages of the design flow. For example, subsequent to making one or more structural netlist optimizations on the path, the system continues processing the path through placement and routing.

In one aspect, the system uses only those circuit blocks, circuit elements, and/or routing resources that are available within the target IC to perform the remaining stages of the design flow on the optimized path. Available means that circuit blocks, circuit elements, and/or routing resources are not used in the current circuit design. In another aspect, the system may utilize circuit blocks, circuit elements, and/or routing resources that are available and/or are unavailable. Unavailable circuit blocks, circuit elements, and/or routing resources are being used in the current circuit design. In that case, the system rips up existing placement and routes and may perform replacement and rerouting for the path and any other portions of the circuit design that were ripped up during the structural netlist optimization process.

In block 430, the system determines the delay of the optimized path. For purposes of discussion, post application of one or more structural netlist optimizations, the selected path is referred to as the "optimized path." For example, the system may determine the delay of the optimized path responsive to the system completing the remainder of the design flow on the selected path, thereby resulting in the optimized path.

In block 435, system compares the delay of the optimized path with the baseline delay of the selected path. In block 440, the system determines whether the delay of the optimized path is less than the baseline delay of the selected path. If so, method 400 proceeds to block 450. If not, method 400 continues to block 445.

In block 445, responsive to determining that the delay of the optimized path is not less than the baseline delay, the system discards the optimized path and keeps the selected, or original, path within the circuit design. Accordingly, the circuit design is not degraded by using an optimization that does not improve timing of the path. In block 450, responsive to determining that the delay of the optimized path is less than the baseline delay, the system incorporates the optimized path within the circuit design. Incorporating the optimized path means that the system deletes or removes the original path that existed within the circuit design prior to application of the one or more structural netlist optimizations and replaces that path with the optimized path. It should be appreciated that the timing information for the optimized path is updated for the circuit design also.

In block 455, the system determines whether any further paths identified in block 415 remain to be processed. If so, method 400 loops back to block 420 to continue processing. If not, method 400 may end.

Figure 5:
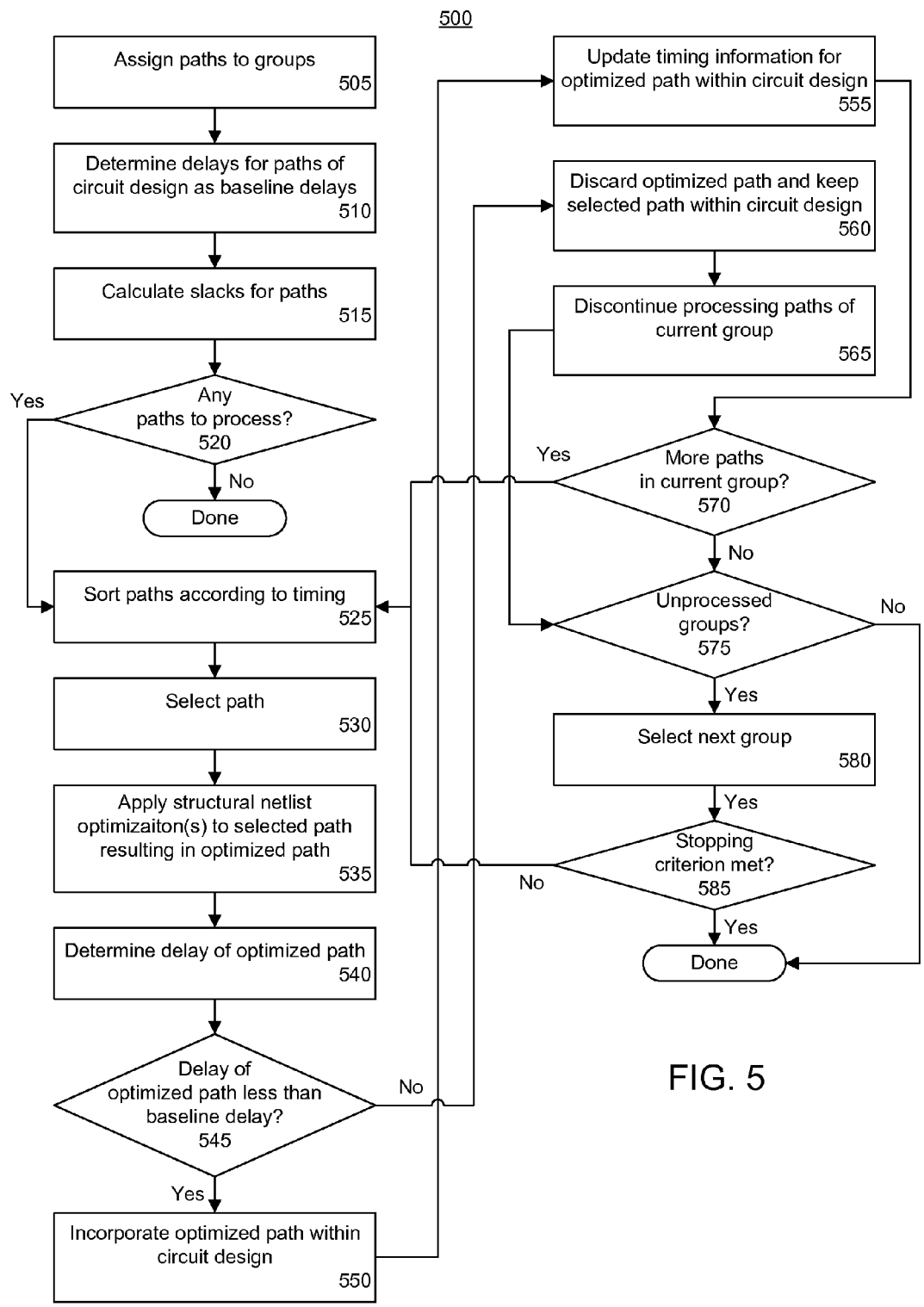
FIG. 5 is a flow chart illustrating another exemplary method of optimizing a circuit design.

FIG. 5 is a flow chart illustrating another exemplary method 500 of optimizing a circuit design. Method 500 illustrates another aspect where paths are organized into groups and processed with reference to the grouping. Method 500 may be performed by a system as described with reference to FIG. 2 and may begin in a state where the circuit design has been routed. For example, method 500 may be an exemplary implementation of block 330 of FIG. 3. Method 500 is an example of a structural netlist optimization process that may be used to improve and/or close timing of a circuit design to be implemented within a target IC. The target IC may have an architecture that is the same as, or similar to, that of FIG. 1.

Method 500 may begin in block 505 where the system assigns paths of the routed circuit design into a plurality of different groups. In one aspect, paths are assigned to groups according to clock domain. As such, each path may be assigned to a group representing the clock domain that includes the path. Each path within a same group is within a same clock domain. In block 510, the system determines the delays of the paths of the circuit design as baseline delays. As such, each delay calculated in block 510 is considered a baseline delay for a corresponding path. In block 515, the system calculates a slack for each path. As discussed, the slack of a path is the timing constraint of the path minus the delay of the path, e.g., minus the baseline delay.

In block 520, the system determines whether the circuit design includes any paths to process. More particularly, the system determines whether the circuit design includes any paths that are to undergo structural netlist optimization. In one aspect, any path meeting one or more predefined selection criteria may be considered a path that is to undergo structural netlist optimization. The selection criteria may depend, at least in part, upon slack of the paths.

One example of a selection criterion is whether a path is a critical path. A critical path, as noted, is a path having a negative slack. Another example of a selection criterion is the difference between the timing constraint of the path and the delay of the path regardless of whether the slack of the path is negative. As an illustrative example, any path that meets a timing constraint but by less than a predetermined amount or percentage may be selected for structural netlist optimization. The slack of that path, though positive, may be less than a threshold positive slack. If the circuit design does not include any paths meeting the selection criteria, method 500 may end. If the circuit design includes one or more paths meeting the selection criteria, method 500 proceeds to block 525.

In block 525, the system may sort the paths that are to be processed, e.g., those meeting the selection criteria, according to timing. Referring to critical paths, for example, the system may sort the critical paths from those considered the most critical to those considered the least critical. Thus, the system sorts paths according to slack from most negative to least negative. In another aspect, the system may sort non-critical paths according to the difference between the timing constraint of the path and the baseline delay of the path, where paths are sorted from the smallest difference to the largest difference.

In block 530, the system may select a path for processing from the set of paths determined to meet the selection criteria. For example, the system may select a path at the top of the sorted list, e.g., the most critical or the path with the smallest difference first. If the system has assigned the paths into different groups, the system first selects a group of paths and, having selected a group, next selects a path meeting the selection criteria from the selected group. In one aspect, the system may select the group having the most critical path as the first group to be processed.

In block 535, the system applies one or more structural netlist optimizations to the selected path. In block 540, the system determines the delay of the optimized path. In block 545, the system compares the delay of the optimized path with the baseline delay of the selected path. If the delay of the optimized path is less than the baseline delay of the selected path, method 500 continues to block 550. If the delay of the optimized path is not less than the baseline delay of the selected path, method 500 proceeds to block 560.

In block 550, the system incorporates the optimized path within the circuit design. As noted, incorporating the optimized path within the circuit design means replacing the selected path of the circuit design with the optimized path determined in block 535. In consequence, the circuit design no longer specifies, or includes, the selected path. Rather, the circuit design includes the optimized path in place of the selected path.

In block 555, the system updates timing information for the optimized path within the circuit design. In one aspect, the timing information includes the delay of the optimized path. In another aspect, the timing information further includes the slack for the optimized path. After block 555, method 500 continues to block 570. In block 570, the system determines whether the current group includes any further paths to be processed. If so, method 500 proceeds to block 525. If not, method 500 continues to block 575.

It should be appreciated that inclusion of the optimized path in the circuit design in replacement of the selected path may be performed responsive to determining that the optimized path has improved timing over the selected path. In some cases, the optimized path may not be critical. In other cases, the optimized path may be critical but still have improved delay compared to the selected path, e.g., be less critical or have a slack that is less negative. Similarly, for a path that was non-critical, but selected for structural netlist optimization, the path may have faster timing, e.g., a smaller delay.

Continuing with block 560, the system has determined that the delay of the optimized path is not less than the baseline delay of the selected path. Accordingly, in block 560, the system discards the optimized path and keeps the selected path within the circuit design. In block 565, the system discontinues processing paths of the current group. The current group is the group that includes the selected path. The system stops processing any further paths from the group that includes the selected path. The system may then select a different, or next, group.

In block 575, the system determines whether any further unprocessed groups remain. If so, method 500 continues to block 580 where the system selects a next group. If no further groups remain to be processed, method 500 may end.

In block 585, the system determines whether a stopping criterion has been met. In one aspect, a stopping criterion specifies one or more conditions that, if met, cause the system to stop processing paths and discontinue the structural netlist optimizations of the circuit design. One exemplary stopping condition is reaching a predetermined and maximum number of iterations. Another exemplary stopping condition is processing a maximum number of paths. If a stopping criterion is met, method 500 ends. If no stopping criterion is met, method 500 may loop back to block 525 to continue processing.

FIGS. 6-16 illustrate different examples of structural netlist optimizations. It should be appreciated that the examples of structural netlist optimizations provided herein are for purposes of illustration only. The examples provided are not intended to be limiting of the inventive arrangements described within this disclosure. Other structural netlist optimizations that may be known and/or structural netlist optimizations not yet developed may be incorporated into the processes described herein. The structural netlist optimizations illustrated may be applied to paths of a circuit design individually or in any combination. One or more of the structural netlist optimizations of FIGS. 6-16 may be applied within block 330 of FIG. 3, block 425 of FIG. 4, and/or block 535 of FIG. 5.

In each of FIGS. 6-13, the left side of the figure represents the path being operated upon in a pre-optimization state, while the right side of the figure illustrates the same path after application of the illustrated structural netlist optimization. In each of FIGS. 14-16, the top portion of the figure represents the path being operated upon in a pre-optimization state, while the bottom portion of the figure illustrates the same path after application of the illustrated structural netlist optimization. In each of FIGS. 6-16, the optimized path is functionally equivalent to the original, or selected, path.

Figure 6:
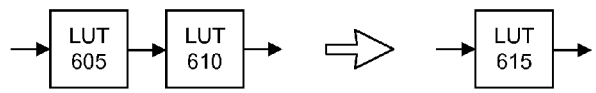
FIG. 6 is a block diagram illustrating an exemplary remap type of structural netlist optimization.

FIG. 6 is a block diagram illustrating an exemplary remap type of structural netlist optimization. A remap type of structural netlist optimization selects a number of combinatorial circuit elements and attempts to reduce the number of circuit levels through which signals must propagate to traverse the path. For purposes of illustration, LUTs are used to represent combinatorial circuit elements within FIGS. 6-15.

As pictured in FIG. 6, a LUT 605 drives a LUT 610. Thus, any signal entering into LUT 605 also propagates through an additional logic level, i.e., LUT 610, prior to reaching the end point of the path (not shown). Applying remap structural netlist optimization, LUTs 605 and 610 may be combined into a single LUT 615. Remap is a type of structural netlist optimization since the resulting LUT 615 has a different configuration than each of LUTs 605 and 610. LUTs, for example, have a finite number of inputs. Not all LUTs may be combined.

In another example, a group of 6 LUTs in a path may be remapped into 4 different LUTs. The remapping may not result in fewer LUTs being utilized, but does result in fewer levels of circuitry that the signals must propagate thereby reducing delay of the path. Referring to FIG. 6, for example, the signals entering LUT 605 pass through two levels of logic, i.e., LUT 605 and LUT 610, whereas the optimized path includes a single logic level formed of only LUT 615.

Figure 7:
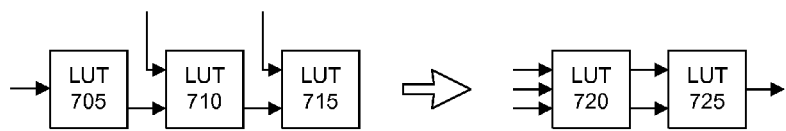
FIG. 7 is a block diagram illustrating an exemplary restructure type of structural netlist optimization.

FIG. 7 is a block diagram illustrating an exemplary restructure type of structural netlist optimization. For purposes of this disclosure, a restructure type of structural netlist optimization may be considered a subset of a remap type of structural netlist optimization. In the case of a restructure type of structural netlist optimization, a plurality of LUTs are combined into one large Boolean logic circuit structure and then rebuilt using different LUTs with different logical structures. In the example of FIG. 7, the system selects LUTs 705, 710, and 715, combines LUTs 705, 710, and 715 into a large Boolean logic circuit structure, and then re-builds the circuit structure using LUTs 720 and 725.

Figure 8:
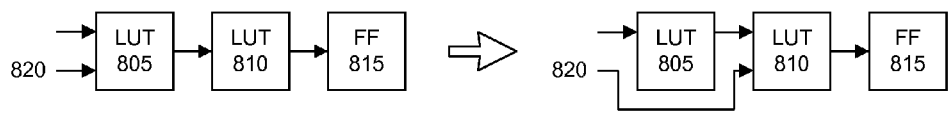
FIG. 8 is a block diagram illustrating an exemplary forward rewire type of structural netlist optimization.
Figure 9:
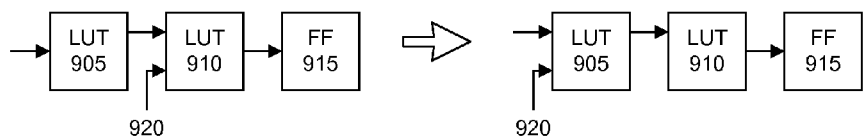
FIG. 9 is a block diagram illustrating an exemplary backward rewire type of structural netlist optimization.

FIGS. 8-9 illustrate exemplary rewire types of structural netlist optimizations. In a rewire type of structural netlist optimization, a critical signal is moved either toward the fanout of a logic cone or toward the fanin of a logic cone.

FIG. 8 is a block diagram illustrating an exemplary forward rewire type of structural netlist optimization. The path on the left side of FIG. 8 includes LUTs 805 and 810 and flip-flop (FF) 815. In this example, signal 820 enters LUT 805 and is the signal being operated upon. For example, signal 820 may be a critical signal. On the right side of FIG. 8, post optimization, signal 820 bypasses LUT 805 and is received directly by LUT 810. The delay of signal 820 is thereby reduced since signal 820 passes through fewer circuit levels to reach the end point, i.e., FF 815, of the path. It should be appreciated that not only is the routing of signal 820 changed, but also the particular circuit operations implemented by each of LUTs 805 and 810 in order for the optimized path to be functionally equivalent to the path pre-optimization.

FIG. 9 is a block diagram illustrating an exemplary backward rewire type of structural netlist optimization. The path on the left side of FIG. 9 includes LUTs 905 and 910, and FF 915. In this example, signal 920 is received by LUT 910 and is not critical. Signal 920 has excess slack. Another signal, however, that may be processed by another LUT (not shown) may be critical. LUT 910 may not have any available inputs. The backward rewire type of structural netlist optimization illustrated on the right of FIG. 9 shows that signal 920 is moved to an input of LUT 905, which frees an input of LUT 910 to receive a critical signal. The criticality of the signal that may be provided to the free input of LUT 910 is either reduced or eliminated. The system utilizes the excess slack of signal 920 by moving signal 920 earlier in the path. Signal 920 may not be critical despite propagating through the additional level of circuitry (e.g., LUT 905) post optimization.

Figure 10:
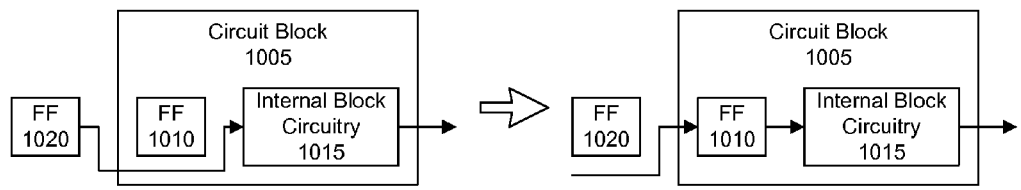
FIG. 10 is a block diagram illustrating an exemplary push type of structural netlist optimization.
Figure 11:
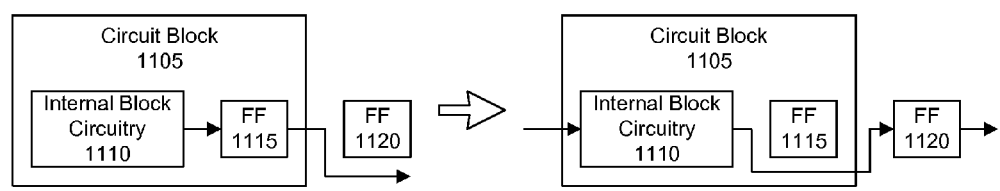
FIG. 11 is a block diagram illustrating an exemplary pull type of structural netlist optimization.

FIGS. 10-11 illustrate exemplary push-pull types of structural netlist optimizations. Push-pull types of structural netlist operations refer to particular circuit blocks available in a target IC such as a DSP block, a BRAM, and a shift register block, or the like that include one or more registers or FFs. In some cases, the FF forming a start point or the end point of a path may be moved either into the circuit block or out from the circuit block. Push-pull types of operations are structural netlist operations since the configuration of particular circuit blocks are changed. It should be appreciated that routing operations generally are limited to wiring that exists external to a circuit block. Changes within a circuit block itself are considered structural netlist operations.

FIG. 10 is a block diagram illustrating an exemplary push type of structural netlist optimization. The left side of FIG. 10 illustrates a circuit block 1005 that includes a FF 1010 and internal block circuitry 1015. Circuit block 1005, for example, may be a DSP block, a BRAM, a shift register block, or the like. Internal block circuitry 1015 may implement the particular functionality, e.g., memory, shift circuitry, DSP operations, of circuit block 1005. In general, circuit block 1005 may be configured to utilize FF 1010 in the input signal path or bypass FF 1010.

On the left side of FIG. 10, a path begins with FF 1020, which is external to circuit block 1005. The path bypasses FF 1010 within circuit block 1005. FF 1020 may be the start of a critical path that flows to internal block circuitry 1015. Applying the push type of structural netlist optimization, the right side of FIG. 10 illustrates that the path previously starting with FF 1020 now starts with FF 1010 within circuit block 1005. The optimization illustrated in FIG. 10 makes the path shorter by moving the start point of the critical path into circuit block 1005.

FIG. 11 is a block diagram illustrating an exemplary pull type of structural netlist optimization. The left side of FIG. 11 illustrates a circuit block 1105 that includes a FF 1110 and internal block circuitry 1115. Circuit block 1105, for example, may be a DSP block, a BRAM, a shift register block, or the like. Internal block circuitry 1110 may implement the particular functionality, e.g., memory, shift circuitry, DSP operations, of circuit block 1105. In general, circuit block 1105 may be configured to include FF 1115 in an output signal path or bypass FF 1115.

On the left side of FIG. 11, a path ends with FF 1115, which is internal to circuit block 1105. The signal path bypasses FF 1120. FF 1115 may be the end of a critical path that flows through circuit block 1105. Applying the pull type of structural netlist optimization, the right side of FIG. 11 illustrates that the path previously ending with FF 1115 now ends with FF 1120, external to circuit block 1105. The optimization illustrated in FIG. 11 makes the path longer by moving the end point of the critical path outside of circuit block 1105. The FF is "pulled" out of circuit block 1105.

Figure 12:
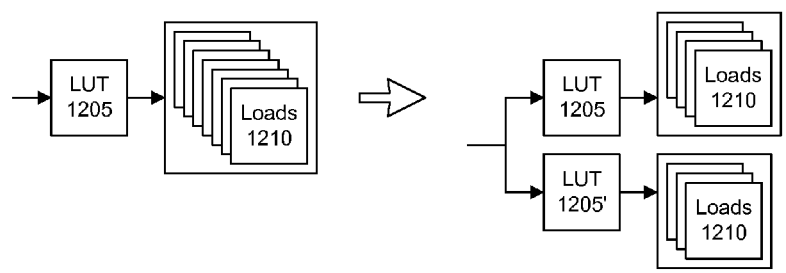
FIG. 12 is a block diagram illustrating an exemplary replication type of structural netlist optimization.

FIG. 12 is a block diagram illustrating an exemplary replication type of structural netlist optimization. On the left side of FIG. 12, LUT 1205 drives a plurality of loads 1210. On the right side of FIG. 12, post optimization, LUT 1205 is replicated into LUTs 1205 and 1205'. LUTs 1205 and 1205' are functionally equivalent. As pictured, loads 1210 previously driven by LUT 1205 are now driven by both LUT 1205 and LUT 1205'. A similar replication technique may be applied to clock buffers for improved clock skew.

Figure 13:
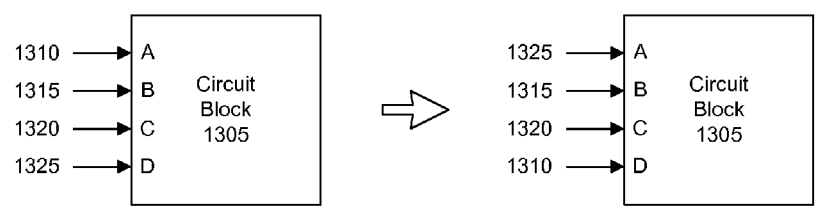
FIG. 13 is a block diagram illustrating an exemplary signal reorder type of structural netlist optimization.

FIG. 13 is a block diagram illustrating an exemplary signal reorder type of structural netlist optimization. On the left side of FIG. 13, circuit block 1305 receives a plurality of input signals 1310, 1315, 1320, and 1325 begin provided to input pins A, B, C, and D of circuit block 1305. In many cases, the pins of a circuit block are not identical. Different inputs may have different timing characteristics that make each pin of the circuit block have a different, or slightly different delay. For example, consider a 4 input AND gate. Each input of the 4 input AND gate may not be identical and induce a different amount of delay on a received signal.

In the example of FIG. 13, signal 1310 may be a critical signal coupled to input pin A of circuit block 1305 on the left side. Input pin A may be a slow input pin. Signal 1325 may have positive slack and be coupled to input pin D of circuit block 1305. Input pin D may be a fast input pin. Post optimization on the right side, signals 1325 and 1310 have been reordered. Signal 1325 is now coupled to the slow input pin A of circuit block 1305 while signal 1310 is coupled to the fast input pin D of circuit block 1305.

Routing may operate to couple a signal to a particular circuit block without reference to the particular pin of the circuit block to which the signal is coupled. Signal reordering may be used to improve the timing of timing-critical signals. Further, signal reordering may be useful when a circuit design contains symmetrical structures such as 64-bit wide multiplexers or the like. Signal reordering is considered a structural netlist optimization since the internal configuration of a circuit block, e.g., pin assignments to signals, is modified as opposed to routing.

Figure 14:
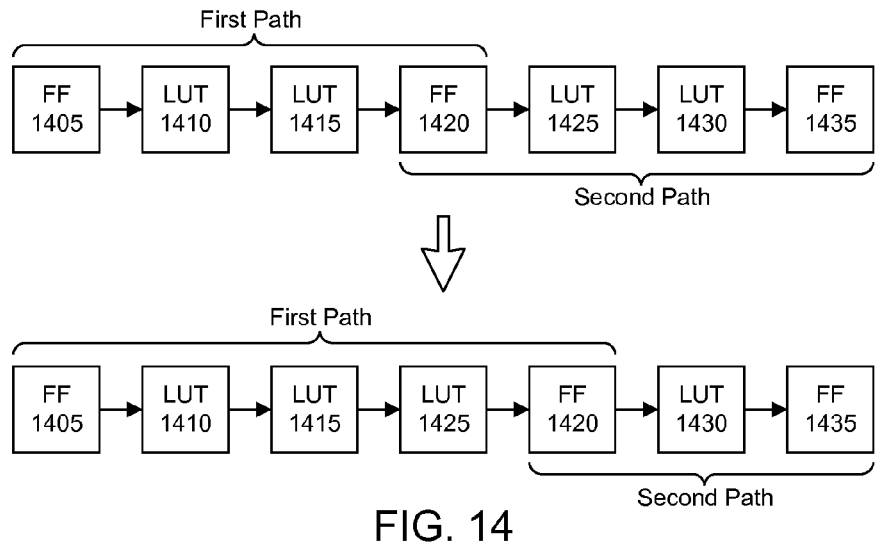
FIG. 14 is a block diagram illustrating an exemplary forward retime type of structural netlist optimization.
Figure 15:
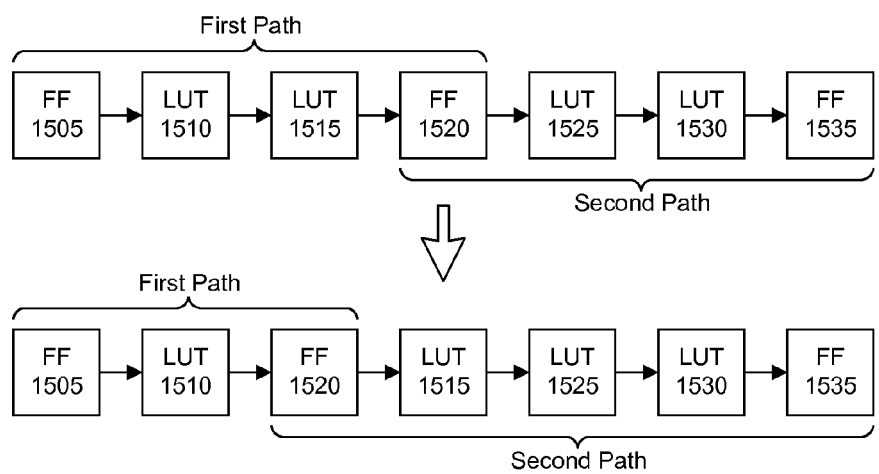
FIG. 15 is a block diagram illustrating an exemplary reverse retime type of structural netlist optimization.

FIGS. 14-15 illustrate exemplary retime types of structural netlist optimizations. FIG. 14 is a block diagram illustrating an exemplary forward retime type of structural netlist optimization. As pictured in the top portion of FIG. 14, a first path has a start point of FF 1405, goes through LUTs 1410 and 1415, and has an end point at FF 1420. A second path has a start point of FF 1420, goes through LUTs 1425 and 1430, and has an end point at FF 1435. In this example, the first path is not critical, while the second path is critical.

Applying a forward retime type of structural netlist optimization, FF 1420 is moved to the right and is located to the right of LUT 1425 in the bottom portion of FIG. 14. In consequence, the first path is lengthened, while the second path is shortened. This increases the delay of the first, non-critical path, while reducing the delay of the second, critical path. Time from the first path is effectively borrowed and provided to the second path.

FIG. 15 is a block diagram illustrating an exemplary reverse retime type of structural netlist optimization. As pictured in the top portion of FIG. 15, a first path has a start point of FF 1505, goes through LUTs 1510 and 1515, and has an end point at FF 1520. A second path has a start point of FF 1520, goes through LUTs 1525 and 1530, and has an end point at FF 1535. In this example, the first path is critical, while the second path is not critical.

Applying a reverse retime type of structural netlist optimization, FF 1520 is moved to the left and is located to the left of LUT 1515 in the bottom portion of FIG. 15. In consequence, the first path is shortened, while the second path is lengthened. This decreases the delay of the first, critical path, while increasing the delay of the second, non-critical path. Time from the first path is effectively borrowed and provided to the second path.

Figure 16:
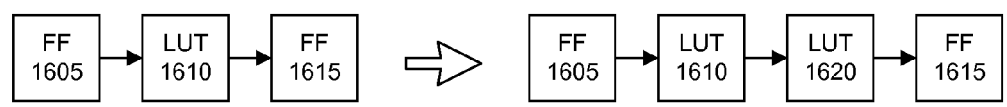
FIG. 16 is a block diagram illustrating an exemplary implementation of a LUT insertion type of structural netlist optimization.

FIG. 16 is a block diagram illustrating an exemplary implementation of a LUT insertion type of structural netlist optimization. LUT insertion may be used to correct a timing hold problem. As pictured on the left side of FIG. 16, FF 1605 is coupled to LUT 1610, which is coupled to FF 1615. Applying a LUT insertion type of structural netlist optimization, LUT 1620 is inserted between LUT 1610 and FF 1615. In this example, LUT 1620 does not change the signals exchanged between LUT 1610 and FF 1615 other than to add delay. The right side of FIG. 16 inserts LUT delay and net delay to improve the HOLD slack of the path.

One or more of the various structural netlist optimizations described within this disclosure may be applied to a path. In one aspect, one or more particular optimizations may be selected and applied. In another aspect, each optimization may be applied, or at least attempted, sequentially. In yet another aspect, the order in which the optimizations may be applied sequentially may be determined by the system based upon known information about the particular path that is to be optimized.

In one aspect, for example, the system may analyze a critical path and determine whether the path includes a circuit block to which a push-pull structural netlist optimization may be applied. If the path includes a circuit block for push-pull, the system further may determine whether the circuit block is near a start point or an end point of the path. If so, then a push-pull structural netlist optimization may be performed. A push type of structural netlist optimization may be applied responsive to determining that the circuit block is at or near a start point of a path. A pull type of structural netlist optimization may be applied responsive to determining that the circuit block is at or near an end point of a path. If, for example, the circuit block is located in the middle of the path, the system determines that a push-pull type of structural netlist operation may not be performed.

In another example, the system may determine the number of circuit, or logic, levels within a selected path. Responsive to the system determining that the path has a number of circuit levels exceeding a predetermined minimum number of circuit levels, the system may attempt to perform a remap (or a restructure) type of structural netlist optimization. In cases where the number of circuit levels of the circuit design does not exceed the minimum number of circuit levels, the system may attempt a rewire type of structural netlist optimization.

In still another example, the system may determine whether a path selected for optimization includes a circuit block with varying input pin delays and, if so, attempt a signal reorder type of structural netlist operation by assigning a signal with excess slack to a slower pin and assigning a signal that is critical to a faster pin.

In yet another example, the system may attempt a retiming type of structural netlist optimization in the event that a path immediately adjacent to a critical path is non-critical or non-critical by at least a minimum amount of time.

The inventive arrangements described within this disclosure relate to performing structural netlist optimization(s) on a routed circuit design. One or more structural netlist optimizations may be applied to one or more paths of the circuit design selected for optimization. Because the optimizations are performed post-routing of the circuit design and the architecture of the target IC is known, a high degree of certainty may be achieved as to whether the optimized path is an improvement over the original un-optimized path. In this regard, those optimizations that are determined to improve timing may be accepted while optimizations that do not improve timing or make timing worse may be rejected.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer-readable storage medium" means a storage medium that contains or stores program code for use by or in connection with an instruction execution system, apparatus, or device. As defined herein, a "computer readable storage medium" is not a transitory, propagating signal per se. Examples of a computer-readable storage media may include, but are not limited to, optical media, magnetic media, magneto-optical media, computer memory such as random access memory, a bulk storage device, e.g., hard disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" is an operation performed by a data processing system or a processor within a data processing system. Examples of executable operations include, but are not limited to, "processing," "computing," "calculating," "determining," "displaying," "comparing," or the like. Such operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/ dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

From time-to-time, the term "signal" may be used within this disclosure interchangeably to describe physical structures such as terminals, pins, signal lines, wires, and the corresponding signals propagated through the physical structures. The term "signal" may represent one or more signals such as the conveyance of a single bit through a single wire or the conveyance of multiple parallel bits through multiple parallel wires. Further, each signal may represent bi-directional communication between two, or more, components connected by the signal.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein is suited.

One or more aspects further may be embedded in a computer program product, which includes all the features enabling the implementation of the methods described herein. The computer program product includes a computer-readable storage medium.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified function(s). It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in other blocks that do not immediately follow.

The corresponding structures, materials, acts, and equivalents of all means or step plus function elements in the claims below are intended to include any structure, material, or act for performing the function in combination with other claimed elements as specifically claimed.

A method may include determining, using a processor, a baseline delay for a path of a routed circuit design, comparing, using the processor, the baseline delay of the path with a timing constraint of the path, and selectively applying, according to the comparing, a structural netlist optimization to the path resulting in an optimized path using the processor.

Selectively applying a structural netlist optimization may include processing the path through a remainder of a design flow.

The method may include determining a delay of the optimized path, comparing the delay of the optimized path with the baseline delay of the path, and responsive to determining that the delay of the optimized path is less than the baseline delay of the selected path, incorporating the optimized path within the circuit design.

The method may include determining a delay of the optimized path, comparing the delay of the optimized path with the baseline delay of the path, and responsive to determining that the delay of the optimized path is not less than the baseline delay of the selected path, discarding the optimized path and keeping the path within the circuit design.

The method may include selecting the path for optimization from a plurality of paths according to criticality of the paths.

In one aspect, the structural netlist optimization may include at least one of a remap operation or a retime operation.

In another aspect, the structural netlist optimization may include at least one of a push-pull operation, a replication operation, or a lookup table insertion operation.

In still another aspect, the structural netlist optimization may include at least one of a rewire operation or a signal reorder operation.

A system may include a processor programmed to initiate executable operations. The executable operations may include determining a baseline delay for a path of a routed circuit design, comparing the baseline delay of the path with a timing constraint of the path, and selectively applying, according to the comparing, a structural netlist optimization to the path resulting in an optimized path.

Selectively applying a structural netlist optimization may include processing the path through a remainder of a design flow.

The processor further may be programmed to initiate executable operations including determining a delay of the optimized path, comparing the delay of the optimized path with the baseline delay of the path, and, responsive to determining that the delay of the optimized path is less than the baseline delay of the selected path, incorporating the optimized path within the circuit design.

The processor also may be programmed to initiate executable operations including selecting the path for optimization from a plurality of paths according to criticality of the paths.

In one aspect, the structural netlist optimization may include at least one of a remap operation, a retime operation, a rewire operation, or a signal reorder operation.

In another aspect, the structural netlist optimization may include at least one of a push-pull operation, a replication operation, or a lookup table insertion operation.

A non-transitory computer-readable medium has instructions stored thereon which, when executed by a processor, perform a method. The method may include determining a baseline delay for a path of a routed circuit design, comparing the baseline delay of the path with a timing constraint of the path, and selectively applying, according to the comparing, a structural netlist optimization to the path resulting in an optimized path.

Selectively applying a structural netlist optimization may include processing the path through a remainder of a design flow.

The method may include determining a delay of the optimized path, comparing the delay of the optimized path with the baseline delay of the path, and, responsive to determining that the delay of the optimized path is less than the baseline delay of the selected path, incorporating the optimized path within the circuit design.

The method may include selecting the path for optimization from a plurality of paths according to criticality of the paths.

In one aspect, the structural netlist optimization may include at least one of a remap operation, a retime operation, a rewire operation, or a signal reorder operation.

In another aspect, the structural netlist optimization may include at least one of a push-pull operation, a replication operation, or a lookup table insertion operation.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
    assigning paths of a routed circuit design to groups based upon clock domain;
    determining, using a processor, a baseline delay for a path of the routed circuit design, wherein the path belongs to a selected group;
    comparing using the processor, the baseline delay of the path with a timing constraint of the path; and
    generating a modified version of the circuit design that is functionally equivalent to the circuit design by selectively applying, according to the comparing, a structural netlist optimization to the path resulting in an optimized path using the processor;
    wherein the structural netlist optimization comprises modifying a configuration of at least one combinatorial circuit element in the path to perform a different operation; and
    wherein the circuit design is adapted to be implemented within an integrated circuit and the paths are processed in an order determined based upon the groups.

2. The method of claim 1, wherein selectively applying a structural netlist optimization further comprises:
    processing the path through a remainder of a design flow.

3. The method of claim 1, further comprising:
    determining a delay of the optimized path;
    comparing the delay of the optimized path with the baseline delay of the path; and
    responsive to determining that the delay of the optimized path is less than the baseline delay of the selected path, incorporating the optimized path within the circuit design.

4. The method of claim 1, further comprising:
    determining a delay of the optimized path;
    comparing the delay of the optimized path with the baseline delay of the path; and
    responsive to determining that the delay of the optimized path is not less than the baseline delay of the selected path, discarding the optimized path and keeping the path within the circuit design; and
    responsive to the discarding, discontinuing processing of paths of the selected group and selecting a path for processing from a next group.

5. The method of claim 1, wherein the structural netlist optimization further comprises moving a critical signal from an input of a first combinatorial circuit element in the path to an input of a second and different combinatorial circuit element in the path.

6. The method of claim 1, wherein the structural netlist optimization comprises inserting a lookup table within the path in response to detecting a timing hold problem, wherein the lookup table adds delay without changing signals exchanged between a first circuit element and a second circuit element separated by insertion of the lookup table.

7. The method of claim 1, wherein the structural netlist optimization comprises modifying pin assignments of a combinatorial circuit element to signals to reorder signals provided to the combinatorial circuit element based upon delays of the pins of the combinatorial circuit element, wherein the signals received by the combinatorial circuit element are unchanged by the structural netlist optimization.

8. The method of claim 1, wherein the structural netlist optimization comprises at least one of a rewire operation or a signal reorder operation.

9. A system, comprising:
    a processor programmed to initiate executable operations comprising:
    assigning paths of a routed circuit design to groups based upon clock domain;
    determining a baseline delay for a path of the routed circuit design, wherein the path belongs to a selected group;
    comparing the baseline delay of the path with a timing constraint of the path; and
    generating a modified version of the circuit design that is functionally equivalent to the circuit design by selectively applying, according to the comparing, a structural netlist optimization to the path resulting in an optimized path;

wherein the structural netlist optimization comprises modifying a configuration of at least one combinatorial circuit element in the path to perform a different operation; and wherein the circuit design is adapted to be implemented within an integrated circuit and the paths are processed in an order determined based upon the groups.

10. The system of claim 9, wherein the processor is further programmed to initiate executable operations comprising:

determining a delay of the optimized path;

comparing the delay of the optimized path with the baseline delay of the path; and responsive to determining that the delay of the optimized path is not less than the baseline delay of the selected path, discarding the optimized path and keeping the path within the circuit design; and responsive to the discarding, discontinuing processing of paths of the selected group and selecting a path for processing from a next group.

11. The system of claim 9, wherein the processor is further programmed to initiate executable operations comprising:

determining a delay of the optimized path;

comparing the delay of the optimized path with the baseline delay of the path; and responsive to determining that the delay of the optimized path is less than the baseline delay of the selected path, incorporating the optimized path within the circuit design.

12. The system of claim 9, wherein the structural netlist optimization further comprises moving a critical signal from an input of a first combinatorial circuit element in the path to an input of a second and different combinatorial circuit element in the path.

13. The system of claim 9, wherein the structural netlist optimization comprises inserting a lookup table within the path in response to detecting a timing hold problem, wherein the lookup table adds delay without changing signals exchanged between a first circuit element and a second circuit element separated by insertion of the lookup table.

14. The system of claim 9, wherein the structural netlist optimization comprises modifying pin assignments of a combinatorial circuit element to signals to reorder signals provided to the combinatorial circuit element based upon delays of the pins of the combinatorial circuit element, wherein the signals received by the combinatorial circuit element are unchanged by the structural netlist optimization.

15. A non-transitory computer-readable medium having instructions stored thereon which, when executed by a processor, perform a method comprising:

assigning paths of a routed circuit design to groups based upon clock domain;

determining a baseline delay for a path of the routed circuit design, wherein the path belongs to a selected group;

comparing the baseline delay of the path with a timing constraint of the path; and generating a modified version of the circuit design that is functionally equivalent to the circuit design by selectively applying, according to the comparing, a structural netlist optimization to the path resulting in an optimized path;

wherein the structural netlist optimization comprises modifying a configuration of at least one combinatorial circuit element in the path to perform a different operation; and wherein the circuit design is adapted to be implemented within an integrated circuit and the paths are processed in an order determined based upon the groups.

16. The non-transitory computer-readable medium of claim 15, wherein the method further comprises:

determining a delay of the optimized path;

comparing the delay of the optimized path with the baseline delay of the path; and responsive to determining that the delay of the optimized path is not less than the baseline delay of the selected path, discarding the optimized path and keeping the path within the circuit design; and responsive to the discarding, discontinuing processing of paths of the selected group and selecting a path for processing from a next group.

17. The non-transitory computer-readable medium of claim 15, wherein the method further comprises:

determining a delay of the optimized path;

comparing the delay of the optimized path with the baseline delay of the path; and responsive to determining that the delay of the optimized path is less than the baseline delay of the selected path, incorporating the optimized path within the circuit design.

18. The non-transitory computer-readable medium of claim 15, wherein the structural netlist optimization further comprises moving a critical signal from an input of a first combinatorial circuit element in the path to an input of a second and different combinatorial circuit element in the path.

19. The non-transitory computer-readable medium of claim 15, wherein the structural netlist optimization comprises inserting a lookup table within the path in response to detecting a timing hold problem, wherein the lookup table adds delay without changing signals exchanged between a first circuit element and a second circuit element separated by insertion of the lookup table.

20. The non-transitory computer-readable medium of claim 15, wherein the structural netlist optimization comprises modifying pin assignments of a combinatorial circuit element to signals to reorder signals provided to the combinatorial circuit element based upon delays of the pins of the combinatorial circuit element, wherein the signals received by the combinatorial circuit element are unchanged by the structural netlist optimization.

* * * * *